United States Patent
Alexander, Jr.

[15] 3,695,626
[45] Oct. 3, 1972

[54] UNI-RUNNER RECREATION DEVICE

[72] Inventor: Kenneth W. Alexander, Jr., 3042 McHenry Avenue, Cincinnati, Ohio 45211

[22] Filed: Nov. 2, 1970

[21] Appl. No.: 85,859

[52] U.S. Cl. .................................................280/12 K
[51] Int. Cl. ................................................B62b 17/00
[58] Field of Search............280/12 K, 87, 64 A, 21 R

[56] References Cited

UNITED STATES PATENTS

| 3,190,668 | 6/1965 | Husak | 280/12 K |
| 1,005,450 | 10/1911 | Meyer | 280/12 K |
| 3,297,334 | 1/1967 | Jenks | 280/12 K |
| 1,155,713 | 1/1928 | Scoville | 280/12 K |

Primary Examiner—Benjamin Hersh
Assistant Examiner—Robert R. Song
Attorney—Wood, Herron & Evans

[57] ABSTRACT

A ski member is provided with detachably mounted wheel assemblies and a detachably mounted and adjustable seat or handlebar element. The wheels may be removed for skiing, or secured thereto for skating or scooting. The seat member may be raised to serve as a handlebar or completely removed so the device can serve as a skateboard.

2 Claims, 1 Drawing Figure

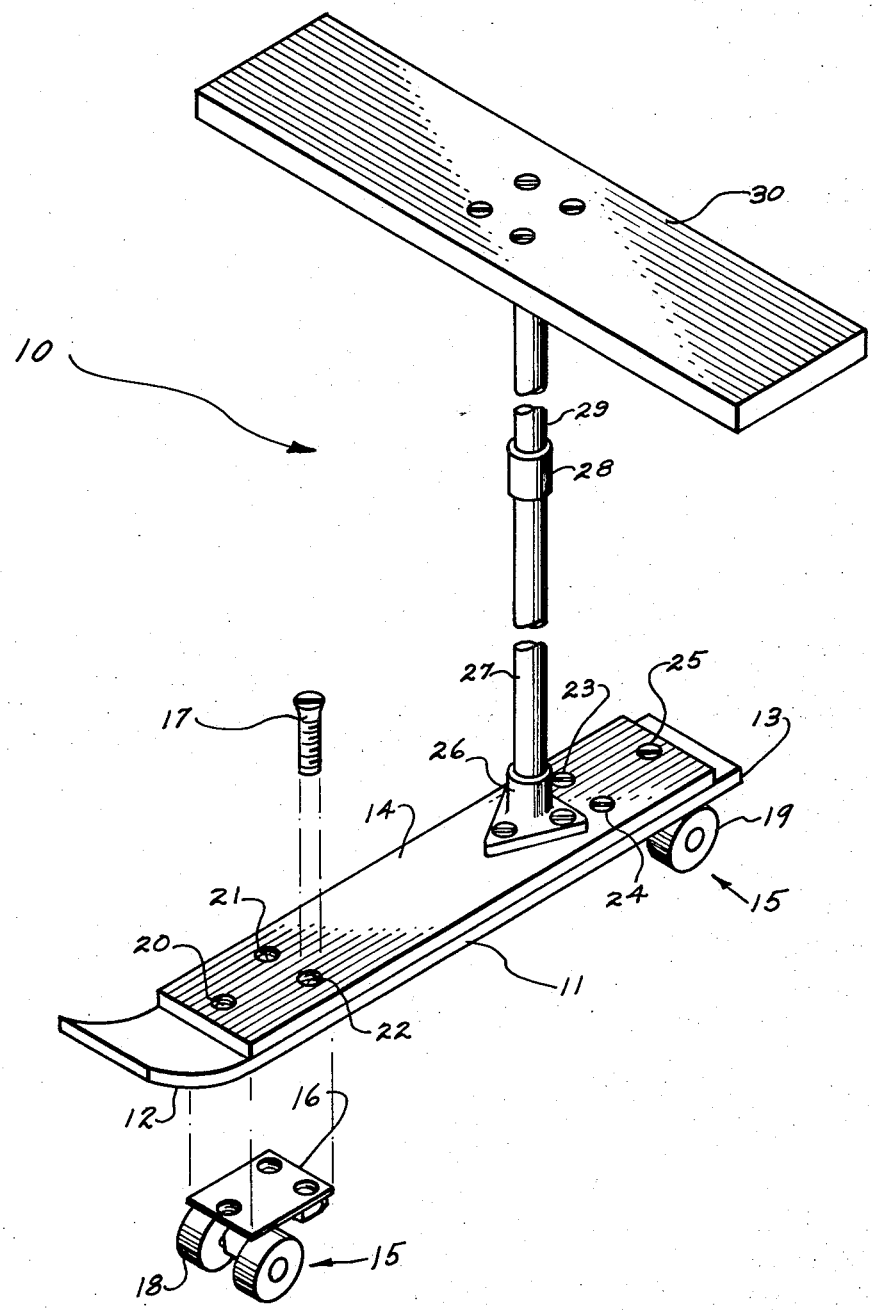

UNI-RUNNER RECREATION DEVICE

BACKGROUND OF THE INVENTION

This invention relates to a recreation device and more particularly to a multiple purpose device adaptable to be used in skiing, skating or scooting.

Skis, skateboards and scooters are all well known individually, but heretofore they have been single purpose devices. It has not been possible, so far as I am aware, to use a single piece of equipment for all of these types of activities.

The present invention is predicated upon the concept of a single apparatus, convertible so as to allow an operator a choice of the activity in which he desires to engage.

Briefly, the invention includes an elongated ski shaped member backed by a reinforcing member for strength. Means are provided for detachably attaching wheels to the ski member. A connector unit is provided on the reinforcing member to support the shaft of a cross member which is usable alternately as a seating element or as a handlebar element, depending on the height at which it is supported above the ski member. When one wishes to utilize the cross member as a seat, a short rod or shaft is connected between the reinforcing member and the cross member. If one wishes to use a handlebar, as in a scooter, a longer support is used which supports the same cross member in a higher position for use as a handlebar.

When the unit is to be used for skiing, the wheels are removed and the ski shaped member may then slide over snow, ice, wet grass, or other appropriate surfaces. Either the seat or handlebar may be used.

It is thus an object of the invention to provide a device adaptable for use as either a ski, skateboard or scooter, the ski or skateboard with or without a seat.

It is a further object of the invention to provide a single device which may be converted into a ski, skateboard or scooter and thereby avoid the necessity of three various separate pieces of equipment.

It is a further object to provide a ski which may be easily converted into a skateboard with or without a seat or into a scooter with a handlebar.

These and other objects and advantages will become apparent from a detailed description of the invention and the drawing in which a partially exploded view of the invention is shown.

Referring to the drawing, a preferred embodiment of the invention is shown generally at 10. An elongated ski member 11 is provided with a curved tip or upwardly bent end 12 and a flat end 13. A reinforcing member 14 is secured to member 11 by means of mounting screws and bolts as will later be explained. The reinforcing member 14 provides strength to the ski member 11, and is advantageous for attachment purposes, as will be explained. It may be omitted, depending upon the use of the invention and upon the strength of the ski member.

Sets of wheels 15 may be mounted at each end of ski member 11 as shown. The wheels may be of the commonly known ball-bearing type as currently used in roller skates or on skate boards. The wheels may be made of wood, steel or any material appropriate to the surface upon which they will roll. The front wheel assembly 18 is releasably secured to the ski member 11 through plate 16 by a plurality of bolts, one of which is shown at 17. The plurality of bolts pass through holes 20–22 in the member 11 to firmly secure wheel assembly 18 to the ski member and reinforcing member 14.

Rear wheel assembly 19 may be mounted near the end 13 of ski member 11, in a manner similar to the mounting of wheel assembly 18, by bolts 23–25 passing through holes. In the alternative, wheel assembly 19 may be of the pivoting type to increase the steerability of the unit. It will be noted that reinforcing member 14 may be secured to ski member 11 by the wheel mounting bolts.

A connector unit or pipe socket 26 is secured to the reinforcing member 14 by any suitable means, preferably releasable, such as screws or bolts.

Connector 26 receives and grips a support pipe 27. This connector may be threaded or may have a set screw which grips the pipe. The upper end of pipe 27 is threaded to receive a collar member 28 and upper support pipe 29 is connected thereto.

An ordinary pipe flange (not shown) is attached to the underneath surface of an elongated cross member 30 and is threaded to receive alternately the upper end of upper support pipe 29 and the upper end of pipe 27. Thus member 30 is firmly attached through shafts or pipes 27, 29 to the reinforcing member 14 and ski member 11.

The lengths of pipes 27 and 29 are selected so that when pipe 27 is used alone, i.e., is threaded directly into the pipe flange on member 30 rather than collar 28, member 30 is at a height appropriate to serve as a seat for one using the invention. When pipes 27 and 29 are used together, member 30 is positioned to a height at which it can be used as a handlebar. Of course, both pipes 27 and 29 and member 30 can be totally removed from the connector unit 26 and it can be removed from member 14, leaving a flat, unobstructed area on member 14.

The invention is adaptable for use in several different modes. When the user desires to ski, he can remove wheel assemblies 18 and 19. He may or may not remove the seat assembly as desired.

When a skateboard is desired, the user can attach wheel assemblies 18 and 19 and remove the seat assembly or leave it as desired.

When a scooter is desired, the user can attach connector 26, pipe 27, collar 28, pipe 29 and member 30 to the reinforcing member and use member 30 as a handlebar.

It will be noted that when used as a scooter, the end 13 will generally be towards the forward direction, while when skiing, end 12 will be towards the forward direction. Of course when the wheel assemblies are attached the invention can be rolled in either direction.

While applicant has specifically described his invention, variations and modification will be apparent without departing from the scope of the invention and applicant intends to be bound only by the appended claims.

Having described my invention I claim:

1. An apparatus adaptable for multiple use as a ski, skateboard and scooter comprising, an elongated ski member having a curved tip at one end thereof, wheel means releasably secured to the ski member at each end thereof, adjustable height support means detachably connected to and extending upwardly from said ski member adjacent the other end thereof, and a cross member carried by said support means which at one height above said ski member comprises a seat and which at a greater height comprises a handlebar, said support means comprising a first length of pipe and a second length of pipe, said first length of pipe supporting said cross member at one height for use as a seat, and said first and second lengths of pipe joined together for supporting said cross member at a greater height for use as a handlebar when said ski member is propelled with said other end thereof as the leading end;

said cross member comprising a flat board projecting transversely across the ski member and being sufficiently long to be used as a handlebar when supported on said second length of pipe.

2. The apparatus of claim 1 wherein the wheel means which are adjacent the other end of said ski member are pivotable about an axis perpendicular to the plane of said ski member.

* * * * *